United States Patent [19]

Cohen

[11] Patent Number: 4,495,836
[45] Date of Patent: Jan. 29, 1985

[54] AUTOMOTIVE VEHICLE POWER DRIVE SYSTEM

[76] Inventor: Max Cohen, 489 Locust La., Cape May Courthouse, N.J. 08210

[21] Appl. No.: 388,055

[22] Filed: Jun. 14, 1982

[51] Int. Cl.³ .......................... F16H 3/74; F16H 37/06; F16H 37/00; G05G 1/00
[52] U.S. Cl. ........................... 74/751; 74/572; 74/675; 74/689; 180/165
[58] Field of Search .............. 74/751, 572, 665 C, 74/665 GB, 675, 689; 180/165; 60/718, 721; 29/434, 469

[56] References Cited

U.S. PATENT DOCUMENTS

| | | | |
|---|---|---|---|
| 2,093,042 | 9/1937 | Fottinger | 74/752 |
| 2,598,164 | 5/1952 | Hamill | 264/11 |
| 2,935,899 | 5/1960 | Nallinger | 180/165 X |
| 3,015,967 | 1/1962 | Bancroft | 74/751 X |
| 3,493,066 | 2/1970 | Dooley | 180/54 |
| 3,641,843 | 2/1972 | Lemmens | 180/165 |
| 3,665,788 | 5/1972 | Nyman | 180/165 X |
| 3,672,244 | 6/1972 | Nasvytis | 74/751 |
| 3,685,371 | 8/1972 | Crooks | 74/792 |
| 3,734,222 | 5/1973 | Bardwick | 180/165 |
| 3,886,810 | 6/1975 | Sugiyama et al. | 74/751 |
| 3,923,115 | 12/1975 | Helling | 180/165 X |
| 4,035,488 | 12/1981 | McIntosh | 180/165 |
| 4,187,741 | 2/1980 | Nyman | 74/751 |

FOREIGN PATENT DOCUMENTS 1130660 5/1954 Fed. Rep. of Germany ........ 74/751
728122 4/1955 United Kingdom .

OTHER PUBLICATIONS

Allen, J. F., "Limitations of Epicyclic Gearing for Variable-Speed Drives," Product Engineering, 10/44, pp. 653–656.

Primary Examiner—Allan D. Herrmann
Assistant Examiner—Stephen B. Andrews
Attorney, Agent, or Firm—Seidel, Gonda & Goldhammer

[57] ABSTRACT

A differential has a first element operatively connected to the output shaft for driving the wheels of the vehicle and a second element operatively connected to a prime mover. The differential includes a third element operatively connected to a fly wheel. The fly wheel and prime mover are arranged to simultaneously drive said output shaft through said differential so that the speed of the vehicle may remain constant or vary regardless of the speed of the fly wheel. The fly wheel is capable of being driven by a source external of the prime mover so that the fly wheel may assist the prime mover during acceleration of the vehicle.

17 Claims, 4 Drawing Figures

AUTOMOTIVE VEHICLE POWER DRIVE SYSTEM

BACKGROUND

Due to the need for less consumption of fuel, the automobile industry is focusing its efforts on drastic reduction of weight of vehicles along with considerable reduction in acceleration performance. Lightweight vehicles represent a safety factor whereby traffic fatalities substantially increase in connection with collisions of lighter weight cars. In addition, cars with poor acceleration constitute a hazard when entering a high speed highway or when passing another vehicle.

It is old and well known to provide a fly wheel for absorbing fluctuations in speed to thereby even out the torque output of the engine. Since a heavy fly wheel prevents a rapid increase in rotational speed when the throttle is open, increased acceleration can be obtained by decreasing the size and weight of the fly wheel but that is attained at a sacrifice of smooth running in the low speed ranges.

Prior fly wheel energy storage systems in motor vehicles are characterized by several obstacles, primarily lack of a low cost, high capacity, wide ratio and efficient continuously variable ratio transmission (CVT) and a satisfactory control system therefore.

The present invention addresses itself to solution of the problem of attaining higher miles per gallon without decreasing the size and weight of the vehicle or compromising its acceleration ability. Thus, the present invention is directed to an arrangement whereby a full sized automobile can achieve on the road fuel economy levels equaling or exceeding those of light weight, low performance vehicles while maintaining performance and convenience meeting traditional standards.

SUMMARY OF THE INVENTION

The present invention relates to an automotive vehicle power drive system. A differential is provided with at least three elements. The first element is operatively connected to an output shaft adapted to drive the front or rear wheels of the vehicle. The second element is operatively connected to a prime mover such as an internal combustion engine or the equivalent. Means including a fly wheel is operatively connected to the third element of differential for storing energy. Each of the second and third elements are operatively coupled to the first element but not directly to each other.

The fly wheel and the prime mover are each arranged to simultaneously drive the output shaft through the differential so that the speed of the vehicle may remain constant or vary regardless of the speed of the fly wheel. The torque applied to the output shaft is controlled by the torque applied to said second element by the prime mover. A means is provided for driving the fly wheel so that the fly wheel may assist the prime mover during acceleration.

It is an object of the present invention to reduce the size of the engine in a vehicle by providing another source of power to assist during acceleration thereby allowing a smaller engine to operate at cruising speeds nearer wide open throttle and optimum efficiency.

It is another object to provide an internal combustion engine with an alternate means for starting the engine.

It is another object of the present invention to provide a power drive system where energy is stored in a fly wheel which may be utilized to start and/or accelerate a vehicle by itself or in combination with the prime mover.

It is a further object to provide a power drive system where energy stored in a flywheel may be in part or wholly derived from energy recovered during braking the vehicle, said energy usually wasted in heat dissipated at the wheel brakes.

A significant portion of acceleration power employed in the present invention is supplied from outside the engine and may be supplied virtually instantaneously whereby the amount of time required to reach higher engine power levels are both alleviated whereby improvements in performance, efficiency, and emissions are attained. As a result thereof, and the combination of savings to be attained by the present invention, a full sized automobile can achieve on the road fuel economy levels equalling or exceeding that of lightweight vehicles. Another advantage of the present invention is the decrease in the size of the power plant while increasing efficiency in the form of miles per gallon.

Other objects and advantages will appear hereinafter.

For the purpose of illustrating the invention, there is shown in the drawing a form which is presently preferred; it being understood, however, that this invention is not limited to the precise arrangements and instrumentalities shown.

DETAILED DESCRIPTION

Figure 1:
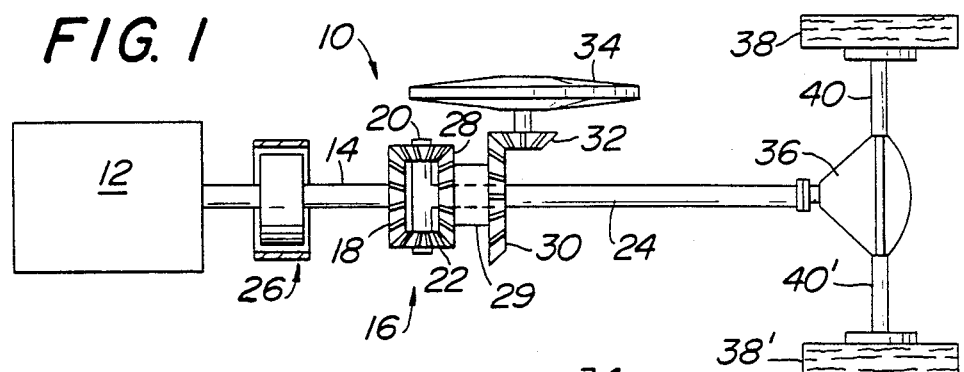
FIG. 1 is a diagramatic plan view of a first embodiment of the present invention.

Referring to the drawings in detail, wherein like numerals indicate like elements, there is shown in FIG. 1 a diagramatic plan view of a power drive system in accordance with the present invention. The illustration in FIG. 1 is diagramatic in that many components are not illustrated therein such as bearings and the like.

In FIG. 1 there is illustrated a vehicle having a power drive system designated generally as 10. The system 10 includes the prime mover 12 having an engine shaft 14 connected to the differential 16. Differential 16 may be a bevel gear type, a planetary gear type, epicyclic type, and other mechanical transmissions. Differential 16 is preferably a bevel gear type as shown. The differential 16 includes a bevel gear 18 connected to the shaft 14. Gear 18 is meshed with bevel gears 20 and 22 connected to the output shaft 24. Engine shaft 14 may be provided with a brake 26.

The bevel gears 20 and 22 on the output shaft 24 are meshed with a bevel gear 28. Bevel gear 28 is connected to bevel gear 30 by a collar surrounding the output shaft 24. Bevel gear 30 meshes with bevel gear 32 for driving or being driven by the fly wheel 34. The output shaft 24 is connected to the differential 36. Differential 36 drives the wheel 38 on axle 40 and the wheel 38' on axle 40'.

The system 10 employs a simple bevel gear differential 16 in which the speed of the output shaft 24 is one-half the sum of the speeds of the engine shaft 14 and the fly wheel-connected gear 28. Thus, the speed of output shaft 24 can be controlled by changing the speed of the prime mover 12 as in a conventional motor vehicle. All control can be accomplished in a normal way without instability or transient overloads. For example, a vehicle using this arrangement may have a speed of 2000 rpm for output shaft 24, a speed of 3500 rpm for the fly wheel-connected gear 28, and an engine speed of 500 rpm. The engine throttle may be utilized to cause the vehicle to accelerate as torque is transmitted through the differential 16 to the output shaft 24. At the same time, the fly wheel is loaded by the prime mover 12 through gears 18, 20, 22, 28, 30 and 32.

When the speed of the output shaft 24 is accelerated to 3000 rpm, the speed of the flywheel-connected gear 28 may drop to 2000 and the speed of engine shaft increased to 4000. This description would represent an example of a vehicle accelerating from 36.7 to 55 miles per hour. At the end of the acceleration at 55 mph, the prime mover 12 is supplying two-thirds of the horsepower to the output shaft 24 which is receiving twice the torque of the prime mover 12 thereby allowing a smaller prime mover to provide acceleration performance equal to that of a much larger one. The prime mover 12 is governed by conventional means so that the speed thereof is adjusted to maintain desired output speed on the shaft 24 and compensate for falling fly wheel speed. This may be accomplished directly by throttle control by the driver of the vehicle who applies pressure to the accelerator pedal to maintain steady speed. Unless the vehicle is going downhill or begins to decelerate, the fly wheel continues to slow down as it gives up its stored energy.

When the vehicle travels down a steep hill, the engine is throttled and the output shaft 24 becomes the flywheel driving element through the differential 16. The prime mover 12 is driven in compression and the fly wheel 34 is driven to speed up. The torque developed at the fly wheel shaft for driving the fly wheel 34 is equal to the resistance of the engine shaft 14 and one-half the braking torque on the output shaft 24. In other words, vehicle braking and fly wheel acceleration are controlled by resistance on the engine shaft 24. For low rates of braking this resistance is supplied by the throttled engine operating in compression. For more rapid braking action, the brake 26 on the engine shaft 14 is applied and controlled to attain the desired braking action. During this braking action, part of the kinetic energy of the vehicle is transmitted to the fly wheel 34 where it is stored for later use and part is wasted at the engine shaft 14.

To repeat acceleration performance uniformly at will, it is desirable to let the fly wheel 34 idle during cruising and provide a means by which the fly wheel 34 may be brought up to the desired speed prior to the time when acceleration is needed. There are a number of ways in which this may be accomplished.

Figure 2:
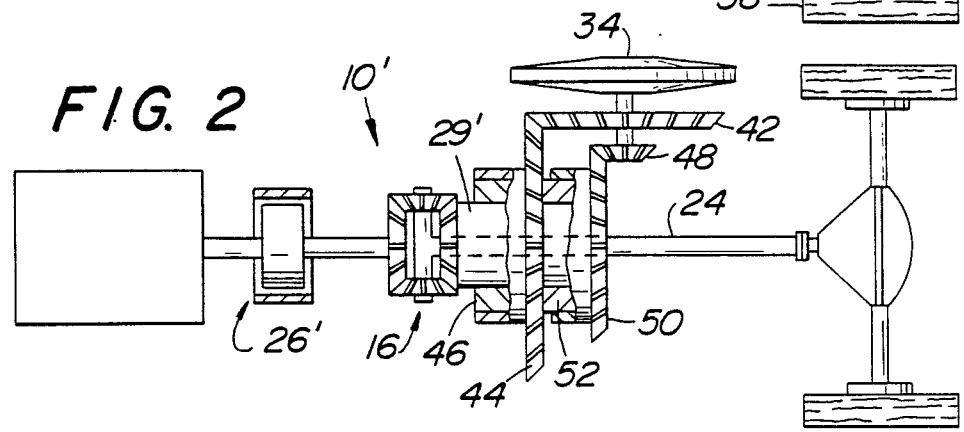
FIG. 2 is a diagramatic plan view of a second embodiment of the present invention.

In FIG. 2 there is illustrated another embodiment of the present invention designated generally as 10'. The system 10' is the same as the system 10 except as will be made clear hereinafter.

The system 10' illustrates one way in which the proportion of energy lost at the engine shaft 14 may be reduced thereby increasing the proportion at recovery at the fly wheel 34. The fly wheel 34 is connected by way of meshing bevel gears 42 and 44 through a one way clutch 46 to the sleeve 29'. The fly wheel 34 is also coupled by way of meshing bevel gears 48 and 50 through one way clutch 52 to the sleeve 29'. In clutch 46, the outer race would overrun while in clutch 52 the inner race would overrun. During braking, clutch 46 would drive the fly wheel 34. During acceleration, the fly wheel 34 may drive the output shaft 24 by way of gears 48 and 50 and clutch 52 which couples gear 50 to the sleeve 29'.

Figure 3:
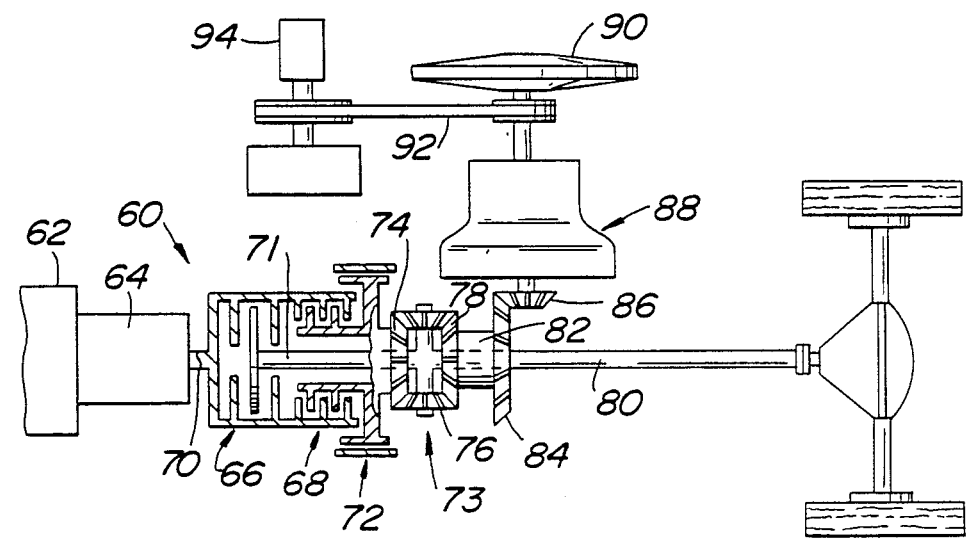
FIG. 3 is a diagramatic plan view of a preferred embodiment of the present invention.

In FIG. 3, there is diagramatically illustrated another embodiment of the present invention wherein the system is designated generally as 60. The system 60 includes a prime mover 62 preferably connected by a constantly variable speed transmission 64 to a clutch shaft 70. Shaft 70 is coupled by way of clutch 66 to the extension shaft 71 of the output shaft or by way of clutch 68 to the brake 72. The brake 72 is connected to gear 74 of the differential 73. A pair of bevel gears 76 are meshed with gear 74 and connected to the output shaft 80. A bevel gear 78 is meshed with the gear 76 and connected to the sleeve 82. Sleeve 82 surrounds shaft 80 and is connected to bevel gear 84.

The bevel gear 84 is meshed with bevel gear 86. Gear 86 is mounted on a shaft connected to an automatic transmission containing a fluid torque-converter coupling 88 which in turn has its output connected to the fly wheel 90. Fly wheel 90 drives an accessory such as the pump 94 for a power steering unit by way of belt 92.

In system 60, the output of engine transmission 64 may be connected by way of clutch 66 to the extension 71 on the output shaft 80 or through clutch 68 which will result in the output shaft 80 being driven and the fly wheel 90 being loaded. The torque-converter coupling 88 has a one-way clutch so that it operates only during braking whereby the output is connected to the fly wheel 90 and during acceleration the torque-converter coupling is by-passed and the flywheel drives gear 86 directly. Other equivalent hydrokinetic devices such as torque converters and fluid couplings may be used in place of coupling 88. When brake 72 is applied to slow the vehicle, coupling 88 enables the flywheel 90 to be driven by the momentum of the vehicle at or below the speed of gear 86 as allowed by slippage of coupling 88.

Figure 4:
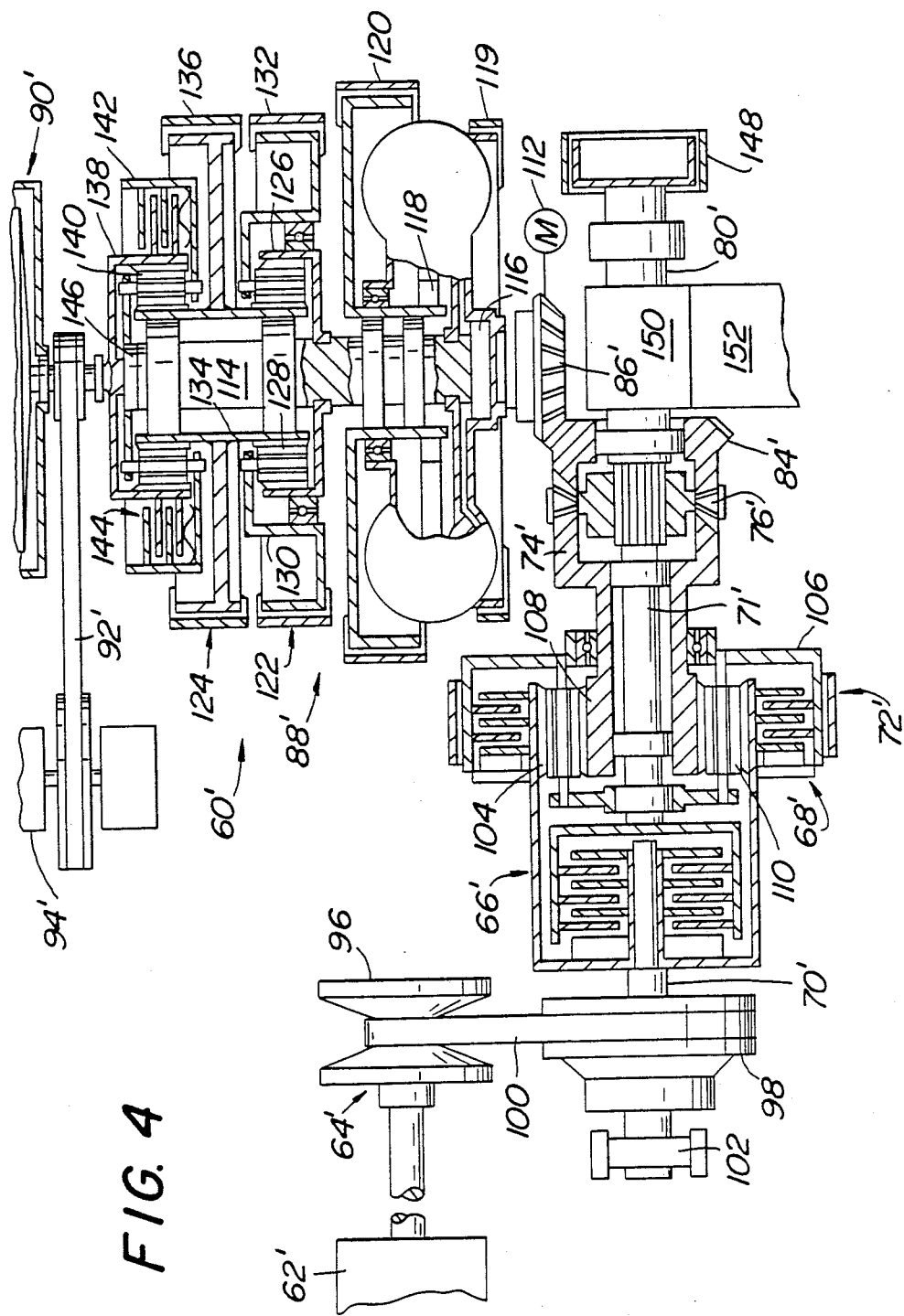
FIG. 4 is an enlarged sectional view of the embodiment shown in FIG. 3.

In FIG. 4 there is illustrated another embodiment of the present invention designated 60' which is a more detailed arrangement of the diagramatic showing in FIG. 3. Hence, the system 60' in FIG. 4 will be described with corresponding primed numerals.

The system 60' in FIG. 4 illustrates the preferred transmission 64' as being a continuously variable transmission defined by pulleys 96, 98 coupled together by belt 100. Pulley 96 is connected to the crankshaft of prime mover 62'. Pulley 98 is fixedly connected to the clutch shaft 70'. The ratio of the speed of pulley 96 to pulley 98 can be varied continuously through a range of 5 to 1 by any convenient means such as hydraulic pistons not shown for opening one pulley while closing the other. Adjustment of the transmission 64' as well as the brakes, clutches and motor, etc. of system 60' may be automatically controlled by sensors responsive to conditions such as output shaft, fly wheel speed, engine load, as well as a command of a driver through position and pressure on the accelerator and brake pedals, transmission selector lever, etc.

Shaft 70' is prevented from reversing by one-way clutch 102 which is fixedly attached to the casing not shown. Shaft 70' is attached to one side of a hydraulically actuated friction clutch 66' and one side of the clutch 68' defined by the ring gear 104. The other side of clutch 66' is fixedly attached to the extension shaft 71' of the output shaft 80'. The other side of clutch 68' is attached to a planet carrier 106.

The planet carrier 106 can be halted by a hydraulically actuated friction brake 72'. Sun gear 108 is attached to the differential gear 74'. Planetary gears 110 are supported by the planet carrier 106 and meshed with the sun gear 108 and ring gear 104. A ring supports the end of the planetary gears 110 at the end remote from the carrier 106, with such ring being mounted on a bearing on shaft 71'.

An electrical starter motor 112, which may be started from an external source of electrical potential, is coupled to the bevel gear 86'. Gear 86' is connected to a one-way clutch 116 which is connected to shaft 114 so that gear 86 may overrun shaft 114. Gear 86' drives one-half of the torque-converter coupling 88' and is controlled by brake 119. The other half of the coupling 88' drives the shaft 114. During braking, gear 86' overruns shaft 114 then driving shaft 114 by way of coupling 88'. The coupling 88' is preferably a conventional coupling widely used in automobile transmissions and includes a stator or reaction member which can free wheel in a conventional manner on clutch 118 when the unit is acting as a coupling. The other side of clutch 118 may be stopped or freed by hydraulically actuated friction brake 120.

Two coupled planetary gear sets 122, 124 are arranged on shaft 114 to make up a three speed (two reduced speeds and direct) automatic transmission similar to that used widely in conventional automobiles. The planetary gear set 122 comprises a ring gear 126 meshed with planetary gears 128 on the planetary carrier 130. Carrier 130 may be stopped by brake 132. A sun gear 134 is common to each of the gear sets 122, 124. The sun gear 134 may be stopped by a brake 136.

The gear set 124 includes a ring gear 138 which is attached to the shaft of fly wheel 90'. Gear 138 is coupled by way of planetary gears 140 to the sun gear 134. The planetary gears 140 are supported by a planetary carrier 142. Carrier 142 is attached to one side of a hydraulically actuated friction clutch 144 so that the shaft 114 may drive the fly wheel 90' directly. Shaft 114 is also coupled to one side of one-way clutch 146 having its other side attached to the shaft of the fly wheel 90' so that the fly wheel may overrun shaft 114 and engagement occurs only when shaft 114 drives the fly wheel during braking, thus avoiding imposing high loads of braking action on the friction clutch 144.

The ratio between the speed of the fly wheel 90' and that of shaft 114 is determined by the status of brakes 132, 136 and clutch 144, and whether the fly wheel is driving or the shaft 114 is driving. The highest ratio occurs when brake 132 is engaged, brake 136 and clutch 144 are disengaged. The lowest ratio (direct at 1 to 1) occurs when clutch 144 is engaged with the fly wheel driving, but may also occur automatically by way of clutch 146 if shaft 114 is driving, and with brakes 132, 136 and clutch 144 disengaged. Neutral occurs when the fly wheel overruns clutch 146 with brakes 132, 136 and clutch 144 disengaged.

OPERATION OF AN AUTOMOBILE USING THE POWER SYSTEM DESCRIBED IN FIGS. 3 AND 4

Initial Charging Of The Fly Wheel

Before Starting A Trip

When the vehicle has been parked for an extended period of time, the fly wheel 90' will have slowed to a speed below desired speed. The fly wheel may be brought up to desired speed by two methods. First assume that the fly wheel is initially at rest. The fly wheel may be charged automatically by the engine in a total elapsed time of about 20 seconds. A small amount of fuel could be saved by charging the fly wheel via motor 112 temporarily connected to a source of power such as household current. The time for initial charging of the fly wheel is reduced by using a fly wheel which is small compared to prior vehicle usage. With a vehicle having a test weight of 4200 pounds, the fly wheel would have a total energy of about 0.2 hp-hours (150 W-hours) at maximum speed.

Initial charging of the fly wheel by motor 112 proceeds as follows. All brakes and clutches are disengaged except for the parking brake 148. Motor 112 drives gear 86' and the torque-converter coupling 88'. Brake 120 is engaged on the stator-reaction member. If the motor 112 is capable of delivering the required speed to shaft 114, it is simply accelerated until a sensor (not shown) measuring fly wheel speed signals to the controller that the desired speed has been reached. Brake 132 or 136 may be engaged if higher flywheel speeds are required. At that time, the controller terminates the charging operation and activates a signal light on the dashboard to inform the driver that maximum acceleration is available. There is a slight inconvenience of plugging and unplugging the motor 112 to a source of electrical potential prior to starting the vehicle.

Charging the fly wheel as described above allows the initial start of the engine to be accomplished by use of the fly wheel without the battery or starter motor. This is accomplished as follows. Initially all clutches and brakes are disengaged except for the parking brake 148. The continuously variable transmission 64' is in the ratio of 1/2.25. Brake 136 is then engaged. Then brake 72' is engaged causing the engine to be cranked.

The engine is started using motor 112 as follows. Initially all clutches and brakes are disengaged except parking brake 148. The CVT ratio is at minimum, or 1/2.25 to which it automatically returns whenever the engine is not running. Motor 112 is energized, then brake 72 is engaged causing the engine to be cranked. This may be controlled manually by means of a conventional spring loaded starter switch which may be provided for that purpose.

Initial charging of the fly wheel by the prime mover 62' is as follows. Once the prime mover is running so that a load may be placed on it without adverse effect, the ratio of the continuously variable transmission 66' is changed to 2.25/1. Brake 120 is engaged and then brake 72' is engaged. Thereafter, the engine throttle is opened wide. Once maximum permitted engine speed is reached, the transmission 64' is adjusted so as to continue to accelerate the fly wheel until the desired fly wheel speed is reached. At that time, the engine is throttled back to idle speed, the fly wheel will overrun clutch 146, brake 72' and brake 120 are disengaged, and the ready light will be illuminated on the dashboard. The engine is kept running at idle until it is driven off or shut off when an automatic sensor senses warm up.

Driving Off

Driving the vehicle off from at rest is initiated by driver action similar to that of a conventional automatic transmission vehicle by placing the transmission selector lever in drive position, depressing the accelerator pedal, and controlling acceleration by the amount of pressure on and or position of the accelerator pedal. The resulting transmission action is automatically selected from one of three available modes depending on whether the flywheel is charged and/or the engine is running. These modes are: (1) driving off without assistance of the flywheel, (2) driving off with flywheel assistance and the engine running, and (3) driving off with flywheel assistance and the engine not running.

Driving off without flywheel assistance occurs automatically when acceleration is called for when the flywheel is at low speed. Acceleration performance is poor because the small engine is the sole source of power. When the transmission selector lever is placed in the drive position, the engine speed is dropped to idle and the CVT ratio adjusted to maximum, 2.25 /1, parking brake 148 is released and all other brakes and clutches are disengaged. When the accelerator pedal is depressed, the engine is accelerated, brake 119 is engaged, and the vehicle moves off. Acceleration continues by increasing engine speed until maximum permitted engine speed is reached after which time further acceleration is accomplished by adjusting the CVT reduction ratio. When the CVT reduction ratio reaches half that of maximum, a shift is made by disengaging brake 119 and clutch 68, engaging clutch 66' and then increasing the CVT ratio to maximum. Further acceleration and cruising are accomplished by automatic adjustments in CVT ratio and/or engine speed as in conventional automobiles with automatic transmissions. The transmission continues in this mode when acceleration is called for until the flywheel is charged up to speed by charging during cruising and/or during braking as described below.

Driving off with flywheel assistance and the engine running. This proceeds as described above in driving off without assistance of the flywheel until an automatic shift is made at about 14 miles per hour. Brake 119 is released and brake 136 is engaged thereby causing the flywheel to drive output shaft 80' by way of gears 84' and 86'. Output shaft 80' may drive a differential for the front wheels or the rear wheels by way of gears 150, 152. Acceleration continues with automatic adjustment of engine speed and CVT ratio to give the desired acceleration rate, compensate for the dropping speed of the flywheel as it gives up energy, and to produce the most efficient engine operation conditions. At about 30 miles per hour, another automatic shift is made by engaging brake 132 while disengaging brake 136. A final shift is made about 39 miles per hour by engaging clutch 144 and disengaging brake 132.

Driving off with flywheel assistance and the engine stopped occurs when the engine is warmed up and has been shut off during extended idle or during deceleration. In this case, the flywheel provides power to simultaneously accelerate the vehicle and start the engine. When the accelerator pedal is depressed, clutch 66' is engaged, brake 136 is engaged and then brake 72' is engaged at a rate that brings carrier arm 106 to a stop in about 0.5 to 1.0 seconds, thereby causing the flywheel to drive output shaft 80' by way of gears 84' and 86', and also drive gears 74' and 108 in turn driving ring gear 104 and thus cranking the engine through the CVT for starting. When sensors indicate the engine is running, clutch 66' is disengaged. Acceleration continues as described above for driving off with flywheel assistance and the engine running.

Upon release of pressure on the accelerator corresponding to a command to cruise at current speed, clutch 68' is released, clutch 66' engaged, and all other clutches and brakes disengaged except as described below for charging the flywheel while cruising. A steady vehicle speed is maintained by adjustments of CVT ratio and engine speed and throttle opening automatically controlled to produce optimum engine efficiency.

For each vehicle speed, there is a preset range of speeds of the flywheel which will be referred to as minimum, target and maximum. The maximum flywheel speed for a vehicle at rest is the highest operating speed for the flywheel. Target speed is the flywheel speed resulting from an average brake energy recovery from braking the vehicle from a higher speed. During acceleration, the relationship of power delivered by the flywheel and by the prime mover is controlled by flywheel speed and flywheel transmission ratio so as to keep the flywheel as close as possible to the target speed for each vehicle speed. This permits approximately the same amount of energy in the flywheel when accelerating from vehicle speed $V_1$ to speed $V_2$ as is recovered and stored for reuse after braking from speed $V_2$ to $V_1$.

Charging the flywheel while cruising—Flywheel speed may be increased during cruising by energizing electric motor 112 with current from the alternator and/or battery. Such charging may start and continue according to the following criteria. Charging may start and continue up to minimum flywheel speed regardless of the condition of the engine. Above minimum speed, charging continues or is started up to the target speed so long as the engine is operating below maximum permitted power. Above target speed, charging is carried out only if the added load to the engine would result in a preset incremental improvement in specific fuel consumption, as when the engine is operating at part-throttle.

Deceleration and braking—Upon release of most of the pressure on the accelerator pedal by the drive corresponding to a command to slow down, a braking operation is initiated with braking action increasing progressively with further release of pressure on the accelerator and then increasing pressure on the brake pedal. Braking action is effected progressively by first cutting off fuel flow to the engine and changing the CVT to minimum ratio for the slowest engine speed, then clutch 68' is engaged above about 18 miles per hour or brake 72' below about 18 miles per hour causing gear 84' to rotate at or at half the speed of output shaft 80', then brake 120 is engaged, then brake 136 is engaged, then brake 136 is released and brake 132 engaged, then the vehicle wheel brakes are applied first on the pair of wheels not driving, then on all four wheels for maximum braking. When the command is given via the accelerator pedal to resume cruising or accelerate, the brakes are released, clutch 68' is released and clutch 66' is engaged, fuel flow to the engine resumed, and CVT ratio adjusted for the cruise condition. After the engine is started, the vehicle cruises as described above, or if acceleration is called for then progressively as required to effect the desired rate, the engine is brought to full throttle, then full speed, then clutch 68' is engaged, then clutch 144 or brake 136 or brake 132 is engaged depending on vehicle speed and flywheel speed as described above for accelerating.

The present invention may be embodied in other specific forms without departing from the spirit or essential attributes thereof and, accordingly, reference should be made to the appended claims, rather than to the foregoing specification, as indicating the scope of the invention.

I claim:

1. A power drive system in a vehicle comprising a differential having at least three elements, said first element being operatively connected to an output shaft adapted to drive wheels on the vehicle, said second element being operatively connected to a prime mover, means including a flywheel operatively connected to said third element of the differential for storing energy and for enabling said output shaft to drive said flywheel via said third element, each of said second and third elements being operatively coupled to said first element but not directly to each other, said differential being a beveled gear differential gear train wherein said first, second and third elements of the differential are the carrier and the two differential side gears, said flywheel and prime mover each being arranged simultaneously and independently to drive said output shaft through said differential so that the speed of the vehicle may remain constant or vary regardless of the speed of said flywheel, the torque applied to the output shaft being controlled by the torque applied to said second element by the prime mover, means for driving the flywheel so that the flywheel may assist the prime mover during acceleration, and automatic control means for controlling the flywheel energy level so that uniform vehicle acceleration is consistently available over a range of vehicle speeds.

2. A system in accordance with claim 1 wherein said means for drving said flywheel includes said flywheel connected to the output of a torque-converter which at its input end is operatively coupled to the first element of the differential.

3. A system in accordance with claim 1 wherein the prime mover is connected to the differential through a continuously variable transmission which is arranged so that it may be clutchingly connected to the second and/or the first elements of the differential.

4. A system in accordance with claim 1 including a brake between said prime mover and said second element of said differential for applying a braking force thereto thereby causing said third element to drive said fly wheel.

5. A method of providing power for driving a vehicle comprising:
 (a) providing a differential mechanism with three elements;
 (b) providing an output shaft which at one end is operatively connected to the vehicle wheels and at the other end is operatively connected to a first element of said differential mechanism;
 (c) providing a prime mover operatively connected to a second element of said differential mechanism;
 (d) providing an energy accumulating flywheel operatively connected to a third element of said differential mechanism;
 (e) storing energy from time to time in said accumulating flywheel by causing it to accelerate its rotation without drawing energy from the prime mover using a braking force on said output shaft caused by application of a braking force against rotation of said second element so that said output shaft drives said flywheel through said third element;
 (f) providing the driving power to drive said first element of said differential mechanism when said flywheel is turning so that said prime mover and said flywheel both simultaneously mechanically independently drive said output shaft through said differential mechanism, permitting the speed of said wheels to vary or remain constant regardless of the speed of said flywheel, over a range of speeds without it being necessary to change a transmission ratio, and driving said output shaft by variably controlling the driving torque applied to said second element of said differential mechanism by said prime mover;
 (g) providing consistent and uniform vehicle acceleration performance by:
  (1) conserving flywheel energy for acceleration by disconnecting the coupling between the flywheel and the drivewheels except during acceleration and braking, and
  (2) controlling automatically in a preprogrammed manner the amount of energy withdrawn during acceleration over the vehicle operating speed range by controlling the relationship of power delivered by the prime mover and flywheel by controlling the relationship of the speeds of the second and third elements of the differential,
 (h) including controlling by variable ratio transmission means the relative speeds of the second and third elements of said differential during acceleration of the vehicle, so as to control the amount of power consumed from the flywheel during acceleration from one vehicle speed to a higher vehicle speed to an amount equal to that available from the average brake energy recovery and storage process when braking the vehicle between those two speeds.

6. A method in accordance with claim 5 including:
 (a) connecting said flywheel to the third element of said differential mechanism with an automatic transmission;
 (b) controlling the relationship of the speeds of said second and third elements of said differential mechanism by controlling the ratio of said automatic transmission.

7. A method of providing power for driving a vehicle comprising:
 (a) providing a differential mechanism with three elements;
 (b) providing an output shaft which at one end is operatively connected to the vehicle wheels and at the other end is operatively connected to a first element of said differential mechanism;
 (c) providing a prime mover operatively connected to a second element of said differential mechanism,
 (d) providing an energy accumulating flywheel operatively connected to the third element of said differential when the flywheel is driving, and operatively connected to the output of a torque-converter which is in turn operatively coupled at its input end to the first element of said differential when the flywheel is being driven;
 (e) storing energy from time to time in said accumulating flywheel by causing it to accelerate its rotation without drawing energy from the prime mover using a braking force on said output shaft caused by driving the input of said torque-converter at a higher speed than that of its output which is in turn driving said flywheel;
 (f) providing the driving power to drive said first element of said differential mechanism when said flywheel is turning so that said prime mover and said flywheel both simultaneously mechanically independently drive said output shaft through said differential mechanism, permitting the speed of said wheels to vary or remain constant regardless of the speed of said flywheel over a range of speeds without it being necessary to change a transmission ratio, and driving said output shaft by variable controlling the driving torque applied to said second element of said differential mechanism by said prime mover;
(g) providing consistent and uniform vehicle acceleration performance by;
  (1) conserving flywheel energy for acceleration by disconnecting the flywheel from the drivewheels except during acceleration and braking, and
  (2) controlling automatically in a preprogrammed manner the amount of energy withdrawn during acceleration over the vehicle operating speed range by controlling the relationship of power delivered by the prime mover and flywheel by controlling the relationship of the speeds of the second and third elements of the differential.

8. A method in accordance with claim 7 including:
(a) providing an automatic transmission connecting said flywheel to the third element of said differential mechanism and to the output of said torque-converter;
(b) controlling the relationship of the speeds of said second and third elements of said differential mechanism by controlling the ratio of said automatic transmission;
(c) controlling the braking force on said output shaft by controlling the ratio of said automatic transmission during braking.

9. A method in accordance with claim 7 including controlling the braking force on said output shaft by controlling the reaction member of said torque-converter.

10. A method in accordance with claim 8 including controlling the braking force on said output shaft by controlling the reacion member of said torque-converter.

11. A method in accordance with claim 7 including driving said flywheel through the torque converter driven by said first element of the differential, and controlling the torque transmitted thereby by controlling the reaction member of said torque converter thereby controlling the braking force applied to the vehicle drive wheels.

12. A method in accordance with claim 5 including disconnecting the coupling between the flywheel and the output shaft except during acceleration and brake energy recovery, and driving the flywheel while disconnected from the output shaft and thereby controlling the speed of the flywheel to a predetermined flywheel speed range for each vehicle speed, said flywheel speed range being equal to that resulting from an average brake energy recovery operation ending at that vehicle speed.

13. A method in accordance with claim 7 wherein step (g-2) includes controlling by variable ratio transmission means the relative speeds of the second and third elements of said differential during acceleration of the vehicle, so as to control the amount of power consumed from the flywheel during acceleration from one vehicle speed to a higher vehicle speed to an amount equal to that available from the average brake energy recovery and storage process when braking the vehicle between those two speeds.

14. A method in accordance with claim 13 including disconnecting the coupling between the flywheel and the output shaft except during acceleration and brake energy recovery, and driving the flywheel while disconnected from the output shaft and thereby controlling the speed of the flywheel to a predetermined flywheel speed range for each vehicle speed, said flywheel speed range being equal to that resulting from an average brake energy recovery operation ending at that vehicle speed.

15. A power drive system in a vehicle comprising a differential having at least three elements, said first element being operatively connected to an output shaft adapted to drive wheels on the vehicle, said second element being operatively connected to a prime mover, means including a flywheel operatively connected to said third element of the differential for storing energy and for enabling said output shaft to drive said flywheel via said third element, each of said second and third elements being operatively coupled to said first element but not directly to each other, said flywheel and prime mover each being arranged simultaneously and independently to drive said output shaft through said differential so that the speed of the vehicle may remain constant or vary regardless of the speed of said flywheel, the torque applied to the output shaft being controlled by the torque applied to said second element by the prime mover, means for driving the flywheel so that the flywheel may assist the prime mover during acceleration, automatic control means for controlling the flywheel energy level so that uniform vehicle acceleration is consistently available over a range of vehicle speeds, and said prime mover being coupled to the differential by way of a planetary carrier supporting planetary gears meshed with a ring gear connected to the prime mover and sun gear, the sun gear being connected to said second element of the differential, said carrier surrounding an extension of the output shaft which extends through said differential.

16. A power drive system in a vehicle comprising first and second differentials in series, said first differential being a planetary gear train having its input connected to a prime mover, said second differential having at least three elements, said first element being operatively connected to an output shaft adapted to drive wheels on the vehicle, said second element being operatively connected to an output from said first differential, means including a flywheel operatively connected to said third element of the second differential for storing energy and for enabling said output shaft to drive said flywheel via said third element, each of said second and third elements being operatively coupled to said first element but not directly to each other, said second differential being a beveled gear differential gear train wherein said first, second and third elements of the second differential are the carrier and the two differential side gears, said flywheel and prime mover each being arranged simultaneously and independently to drive said output shaft through said second differential so that the speed of the vehicle may remain constant or vary regardless of the speed of said flywheel, the torque applied to the output shaft being controlled by the torque applied to said second element by the prime mover via said first differential, means for driving the flywheel so that the flywheel may assist the prime mover during acceleration, and automatic control means for controlling the flywheel energy level so that uniform vehicle acceleration is consistently available over a range of vehicle speeds.

17. A power drive system in a vehicle comprising a differential having at least three elements, said first element being operatively connected to an output shaft adapted to drive wheels on the vehicle, said second element being operatively connected to a prime mover, means including a flywheel operatively connected to said third element of the differential for storing energy and for enabling said output shaft to drive said flywheel via said third element, each of said second and third elements being operatively coupled to said first element but not directly to each other, said flywheel and prime mover each being arranged simultaneously and independently to drive said output shaft through said differential so that the speed of the vehicle may remain constant or vary regardless of the speed of said flywheel, the torque applied to the output shaft being controlled by the torque applied to said second element by the prime mover, means for driving the flywheel so that the flywheel may assist the prime mover during acceleration, automatic control means for controlling the flywheel energy level so that uniform vehicle acceleration is consistently available over a range of vehicle speeds, said means for driving said flywheel including said flywheel connected to the output of a torque-converter which at its input end is operatively coupled to the first element of the differential, and means for controlling the reaction member of said torque converter thereby controlling the braking force applied thereby on said first element of the differential.

* * * * *